(12) United States Patent
Haraguchi

(10) Patent No.: US 9,469,245 B2
(45) Date of Patent: Oct. 18, 2016

(54) VEHICLE SUN VISOR

(71) Applicant: KYOWA SANGYO CO., LTD., Toyota-shi, Aichi (JP)

(72) Inventor: Takashi Haraguchi, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 200 days.

(21) Appl. No.: 14/217,989

(22) Filed: Mar. 18, 2014

(65) Prior Publication Data

US 2014/0286028 A1    Sep. 25, 2014

(30) Foreign Application Priority Data

Mar. 21, 2013   (JP) .................... 2013-058652

(51) Int. Cl.
*B60Q 3/00*   (2006.01)
*B60Q 3/02*   (2006.01)
*B60J 3/02*   (2006.01)

(52) U.S. Cl.
CPC ............ *B60Q 3/0226* (2013.01); *B60J 3/0282* (2013.01); *B60Q 3/0296* (2013.01)

(58) Field of Classification Search
CPC ... B60Q 3/0226; B60Q 3/0296; B60J 3/0282
USPC ........................................ 362/492
See application file for complete search history.

(56) References Cited

U.S. PATENT DOCUMENTS

| | | | |
|---|---|---|---|
| 4,794,497 A | 12/1988 | Jönsas et al. | |
| 5,117,337 A * | 5/1992 | Sakuma | B60J 3/0282 296/97.5 |
| 5,207,501 A * | 5/1993 | Sakuma | B60Q 3/0226 362/135 |
| 6,264,352 B1* | 7/2001 | Zapinski | B60Q 3/0226 362/135 |
| 2002/0126496 A1* | 9/2002 | Okano | B60Q 3/0226 362/492 |
| 2008/0074866 A1* | 3/2008 | Barker | B60J 3/0282 362/142 |

FOREIGN PATENT DOCUMENTS

| | | |
|---|---|---|
| JP | A-63-151517 | 6/1988 |
| JP | Y-1-39212 | 11/1989 |
| JP | A-5-262135 | 10/1993 |

* cited by examiner

*Primary Examiner* — Peggy Neils
(74) *Attorney, Agent, or Firm* — Oliff PLC

(57) ABSTRACT

An automobile sun visor includes: a sun visor body; and a mirror unit. The mirror unit includes: a mirror; a mirror retaining member to keep the mirror in place; and a mirror cover attached to the mirror retaining member and with a lighting apparatus provided in it. Power is supplied to the lighting apparatus when the mirror cover is moved from a closed position to an open position, and the power supply to the lighting apparatus is shut off when the mirror cover is moved from the open position to the closed position.

2 Claims, 7 Drawing Sheets

VEHICLE SUN VISOR

INCORPORATION BY REFERENCE

The disclosure of Japanese Patent Application No. 2013-058652 filed on Mar. 21, 2013 including the specification, drawings and abstract is incorporated herein by reference in its entirety.

BACKGROUND OF THE INVENTION

1. Field of the Invention

The present invention relates to an automobile sun visor.

2. Description of Related Art

Japanese Patent Application Publication No. 5-262135 (JP 5-262135 A) discloses an automobile sun visor in which a vanity mirror is attached to a sun visor body. The automobile sun visor described in JP 5-262135 A has, on a mirror case, a lamp for lighting and a lamp switch for manually switching on and off the lamp so that the vanity mirror can be used even at night.

SUMMARY OF THE INVENTION

When an automobile sun visor with a vanity mirror is configured so that the vanity mirror is covered by an open-close type mirror cover for preventing the vanity mirror from being a hindrance to the driver, or for protecting the vanity mirror, a lamp for lighting may be disposed on the mirror cover. In such a configuration, it is essential to streamline the power supply system for the lamp.

The present invention provides an automobile sun visor which can effectively streamline the starting and the stopping of power supply to a lighting apparatus.

An automobile sun visor according to the first aspect of the present invention includes: a sun visor body; and a mirror unit provided in the sun visor body including: a mirror; a mirror retaining member to keep the mirror in place; and a mirror cover attached to the mirror retaining member to be movable between a closed position for covering the mirror and an open position for exposing the mirror, with a lighting apparatus provided in it. Power is supplied to the lighting apparatus when the mirror cover is moved from the closed position to the open position, and the power supply to the lighting apparatus is shut off when the mirror cover is moved from the open position to the closed position. In the present aspect, "the mirror cover is configured to be movable between a closed position and an open position" typically refers to the pivoting arrangement in which the mirror cover makes a pivoting motion around a given pivoting shaft. However the arrangement is not limited to this, but suitably includes a sliding arrangement in which the mirror cover slides along the sun visor body surface.

According to the present aspect, the automobile sun visor is configured so that the lighting apparatus is provided in the mirror cover, the power is supplied to the lighting apparatus when the mirror cover is pivoted from the closed position to the open position, and the power supply to the lighting apparatus is shut off when the mirror cover is pivoted from the open position to the closed position. Thus, the power supply to the lighting apparatus can be started or stopped in a streamlined manner by simply carrying out the opening operation or closing operation of the mirror cover.

In the aspect described above, the mirror cover may have a first cover and a second cover in the thickness direction, and the lighting apparatus may be disposed between the first cover and the second cover to be secured to at least one of the first cover and the second cover.

The above configuration makes it possible to easily secure a space in which the lighting apparatus is disposed because the lighting apparatus is disposed between the first and second covers.

In the above configuration, the mirror cover may have a first metal terminal and a second metal terminal; the mirror retaining member may have a third metal terminal corresponding to the first metal terminal and a fourth metal terminal corresponding to the second metal terminal; the first metal terminal and the second metal terminal may be connected to the lighting apparatus; the third metal terminal and the fourth metal terminal may be connected to a power source; the power may be supplied to the lighting apparatus when the mirror cover is moved from the closed position to the open position since the first metal terminal comes in contact with the third metal terminal, and at the same time the second metal terminal comes in contact with the fourth metal terminal; and the power supply to the lighting apparatus may be shut off when the mirror cover is moved from the open position to the closed position since the first metal terminal is separated from the third metal terminal and at the same time the second metal terminal is separated from the fourth metal terminal.

According to the above configuration, a power supply structure that can start and stop the power supply to the lighting apparatus according to the opening and closing motions of the mirror cover is established in a streamlined manner between the mirror cover and the mirror retaining member. Here, the aspect of "power supply" may be either an aspect in which the power supply is started in the middle of the mirror cover movement from the closed position to the open position, or an aspect in which the power supply is started when the mirror cover reaches the open position.

In the above configuration, the mirror cover may have a first metal terminal and a second metal terminal; the sun visor body may have a third metal terminal corresponding to the first metal terminal and a fourth metal terminal corresponding to the second metal terminal; the first metal terminal and the second metal terminal may be connected to the lighting apparatus; the third metal terminal and the fourth metal terminal may be connected to a power source; the power may be supplied to the lighting apparatus when the mirror cover is moved from the closed position to the open position since the first metal terminal comes in contact with the third metal terminal, and at the same time the second metal terminal comes in contact with the fourth metal terminal; and the power supply to the lighting apparatus may be shut off when the mirror cover is moved from the open position to the closed position since the first metal terminal is separated from the third metal terminal and at the same time the second metal terminal is separated from the fourth metal terminal.

According to the above configuration, a power supply structure that can start and stop the power supply to the lighting apparatus according to the opening and closing motions of the mirror cover is established in a streamlined manner between the mirror cover and the sun visor body. Here, the aspect of "power supply" may be either an aspect in which the power supply is started in the middle of the mirror cover movement from the closed position to the open position, or an aspect in which the power supply is started when the mirror cover reaches the open position.

In the above configuration, the third metal terminal and the fourth metal terminal may be formed into a platy shape; when the mirror cover is in the opening process of moving from the closed position to the open position, the third metal terminal may be bent due to the contact with the first metal terminal, and the fourth metal terminal may be bent due to the contact with the second metal terminal; and the third metal terminal and the fourth metal terminal may be extending in the thickness direction of the mirror unit.

According to the above configuration, the contact between the first metal terminal and the third metal terminal, and the contact between the second metal terminal and the fourth metal terminal each involve bending, thereby the positive contact state is maintained to prevent the shortage of power supply. Also, as the third metal terminal and the fourth metal terminal are extended in the thickness direction of the mirror unit, the third metal terminal and the fourth metal terminal can be disposed utilizing the limited narrow space.

In the above configuration, the third metal terminal and the fourth metal terminal may be formed into a platy shape; when the mirror cover is in the opening process of moving from the closed position to the open position, the third metal terminal may be bent due to the contact with the first metal terminal and the fourth metal terminal may be bent due to the contact with the second metal terminal; and the third metal terminal and the fourth metal terminal may be extending in the longitudinal direction of the mirror unit.

According to the above configuration, the contact between the first metal terminal and the third metal terminal, and the contact between the second metal terminal and the fourth metal terminal each involve bending, thereby the positive contact state is maintained to prevent the shortage of power supply. In addition, the third metal terminal and the fourth metal terminal are extending in the longitudinal direction of the mirror unit, which allows the design with which the extending length of the third metal terminal and the fourth metal terminal can be obtained easily to avoid plastic deformation of the third metal terminal and the fourth metal terminal.

According to the first aspect described above, an automobile sun visor which can effectively streamline the starting and the stopping of power supply to a lighting apparatus is provided.

An automobile sun visor according to a second aspect of the present invention includes: a sun visor body; a mirror provided in the sun visor body; and a mirror cover movable between a closed position for covering the mirror and an open position for exposing the mirror, with a lighting apparatus provided in it. The mirror cover has a movable terminal connected to the lighting apparatus, the sun visor body has a fixed terminal connected to the power source end, the power is supplied to the lighting apparatus by the movable terminal coming in touch with the fixed terminal when the mirror cover is moved from the closed position to the open position, while the power supply to the lighting apparatus is shut off by the separation of the movable terminal from the fixed terminal when the mirror cover is moved from the open position to the closed position, and the contact between the movable terminal and the fixed terminal is maintained by the elastic force generated by the elastic deformation of at least one of the movable terminal and the fixed terminal.

According to the aspect described above, the contact between the movable terminals and the fixed terminals is maintained by the elastic force generated by the elastic deformation without having influence from vibration or the like, to assure the stable power supply to the lighting apparatus. Also, in the above aspect, it may be arranged so that the sun visor body has a mirror retaining member to keep the mirror in place, and the fixed terminal is provided in the mirror retaining member.

Also, in the aspect described above, at least one of the movable terminal and the fixed terminal may be a platy terminal fixed at one end with the other end being a free end.

According to the above configuration, terminals that easily undergoes the elastic deformation can be obtained by using a platy terminal of cantilever structure for at least one of the movable terminals and the fixed terminals.

Also, in the above configuration, the fixed terminal may be the platy terminal fixed at one end with the other end being a free end. In addition, the fixed terminal may be extended in the thickness direction of the sun visor body. Further, the fixed terminal may be extended in the longitudinal direction of the sun visor body.

According to the second aspect described above, an automobile sun visor which can effectively streamline the starting and the stopping of power supply to a lighting apparatus and effectively stabilize the power supply to the lighting apparatus, is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
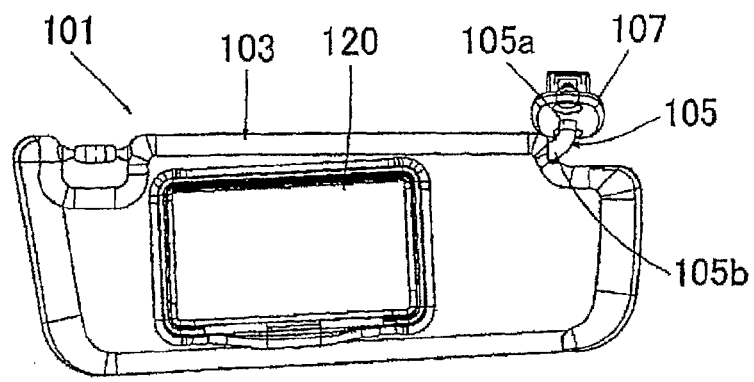
FIG. 1 is a front view showing an overall configuration of an automobile sun visor according to an embodiment of the present invention.

An automobile sun visor according to an embodiment of the present invention will be described hereafter with reference to FIGS. 1 through 5. In general terms, an automobile sun visor 101 according the present embodiment consists mainly of; a sun visor body 103, a spindle 105, a vanity mirror unit 120, and an organic electroluminescence 130, as shown in FIG. 1. The sun visor body 103 is an example of "a sun visor body" in the present invention, the vanity mirror unit 120 is an example of "a mirror unit" in the present invention, and the organic electroluminescence 130 is an example of "a lighting apparatus" in the present invention. The organic electroluminescence 130 will be referred to as an organic EL 130 in the description hereinafter.

The sun visor body 103 defines the outer shape of the sun visor 101, having a generally rectangular shape that is horizontally elongated. The spindle 105 is formed into a generally L-shape, and has a vertical shaft portion 105a extending substantially vertically and a transverse shaft portion 105b extending substantially horizontally. The transverse shaft portion 105b of the spindle 105 is attached pivotally to the peripheral portion of the sun visor body 103, while the vertical shaft portion 105a of the spindle 105 is attached to a mounting bracket 107 so as to be pivotable relative to the mounting bracket 107. Then, the mounting bracket 107 is attached to the ceiling face of a vehicle compartment.

The sun visor body 103 attached to the ceiling face of the vehicle compartment can switch its position between a fold-up position where the sun visor body 103 is placed generally in parallel with the ceiling face of the vehicle compartment, and an operating range (shading range) which includes any position other than the fold-up position, by being pivoted around the transverse shaft portion 105b.

As shown in FIG. 1, the vanity mirror unit 120 is disposed on the front face of the sun visor body 103, which faces the vehicle compartment, or, opposes to a occupant when the sun visor body 103 is pivoted to the operating range. A recess is formed on the front face of the sun visor body 103 to dispose the vanity mirror unit 120 in it. The recess has a horizontally elongated generally rectangular shape, and has a given depth in the thickness direction of the sun visor body 103. The vanity mirror unit 120 is accommodated in the recess.

Figure 2:
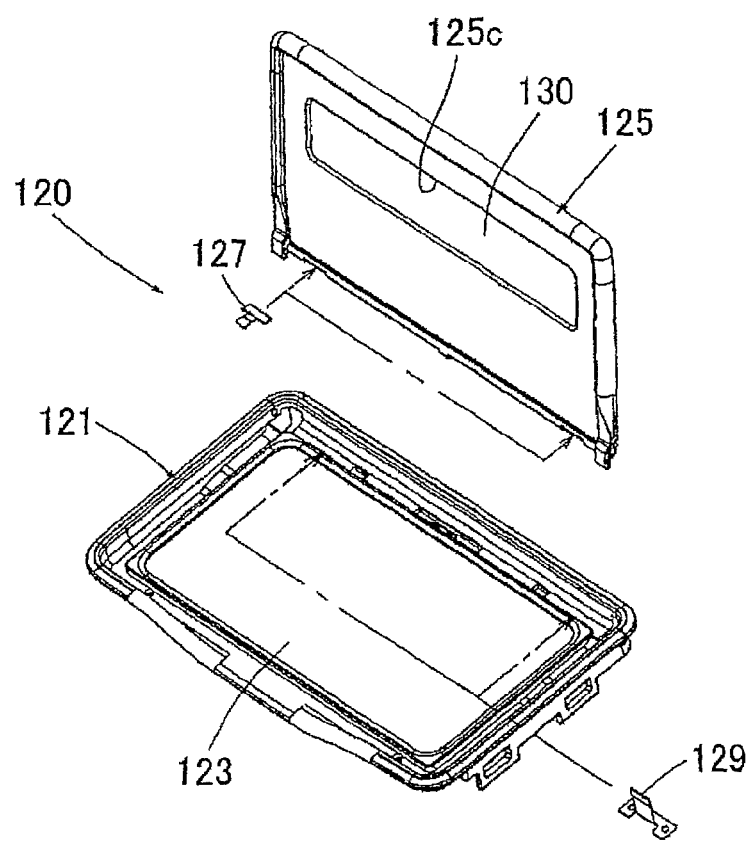
FIG. 2 is an exploded perspective view showing a vanity mirror unit.

FIG. 2 shows the vanity mirror unit 120 in the disassembled state. The vanity mirror unit 120 is mainly consists of; a mirror trim 121, a vanity mirror 123, and a mirror cover 125. The mirror trim 121 is formed into a frame having a horizontally elongated generally rectangular shape, and the rectangular shaped vanity mirror 123 is accommodated and retained within the frame. The mirror trim 121 is an example of "a mirror retaining member" in the present invention, the long side upper edge being on the upper side in state where the vanity mirror 123 has been an example of "a mirror" in the present invention, and the mirror cover 125 is an example of "a mirror cover" in the present invention.

The mirror cover 125 is configured as a platy member having a horizontally elongated generally rectangular shape and dimensions sufficient to cover the vanity mirror 123. The mirror cover 125 is attached, so as to be pivotable up and down, via a mounting shaft (not shown in the figure for the purpose of convenience) to both ends of the long side upper edge of the mirror trim 121 while the sun visor body 103 is pivoted to the operating range. In other words, the mirror cover 125 is joined to the mirror trim 121 so that the mirror cover 125 can be pivoted around the mounting shaft to switch between an open position for exposing the vanity mirror 123 and a closed position for covering the vanity mirror 123. The open position corresponds to "an open position" in the present invention, and the closed position corresponds to "a closed position" in the present invention.

Figure 3:
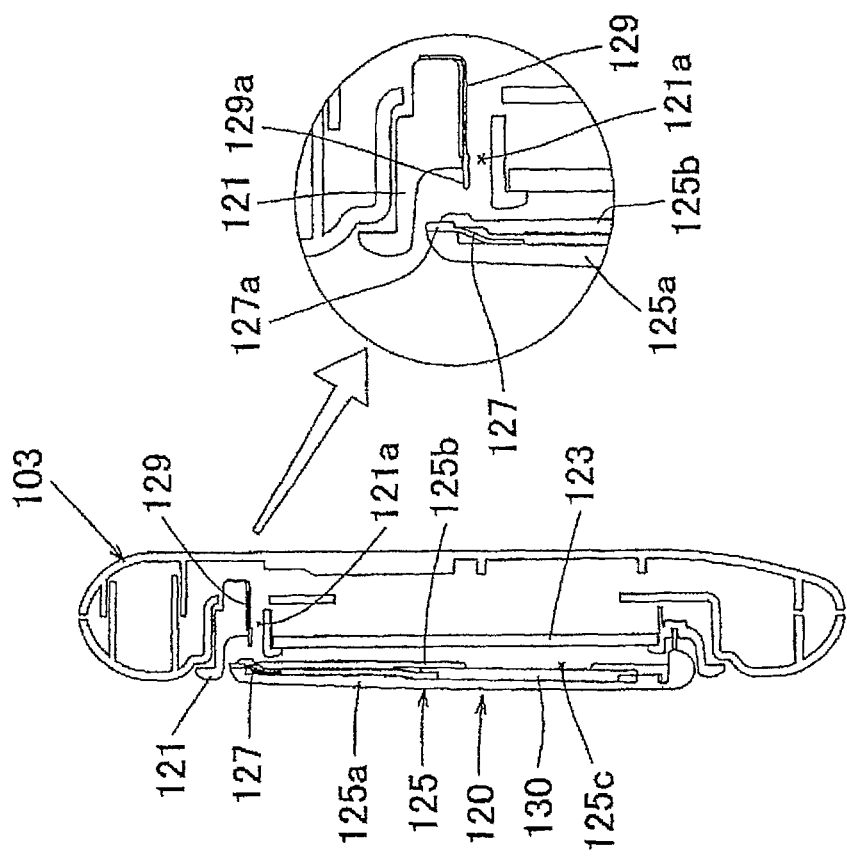
FIG. 3 is a longitudinal sectional view of the vanity mirror unit, with a mirror cover being in a closed position.
Figure 4:
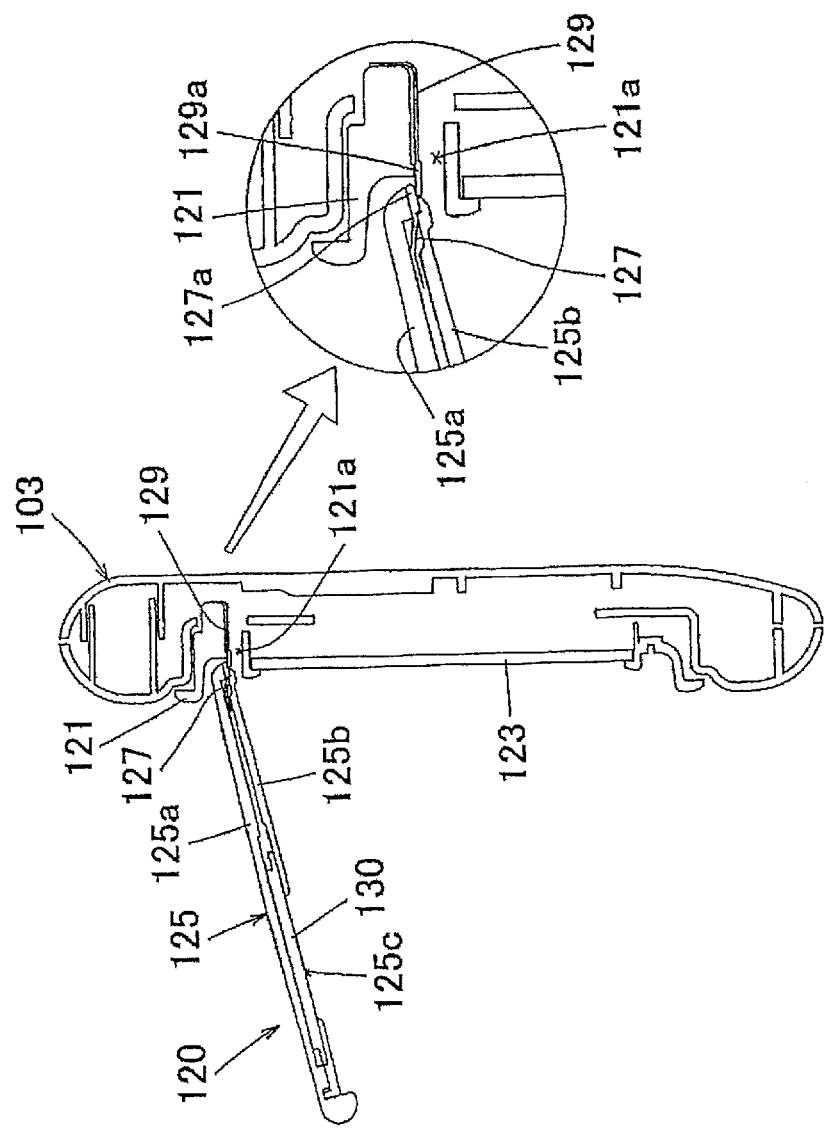
FIG. 4 is a longitudinal sectional view of the vanity mirror unit, with a mirror cover being in the middle of a pivoting motion.
Figure 5:
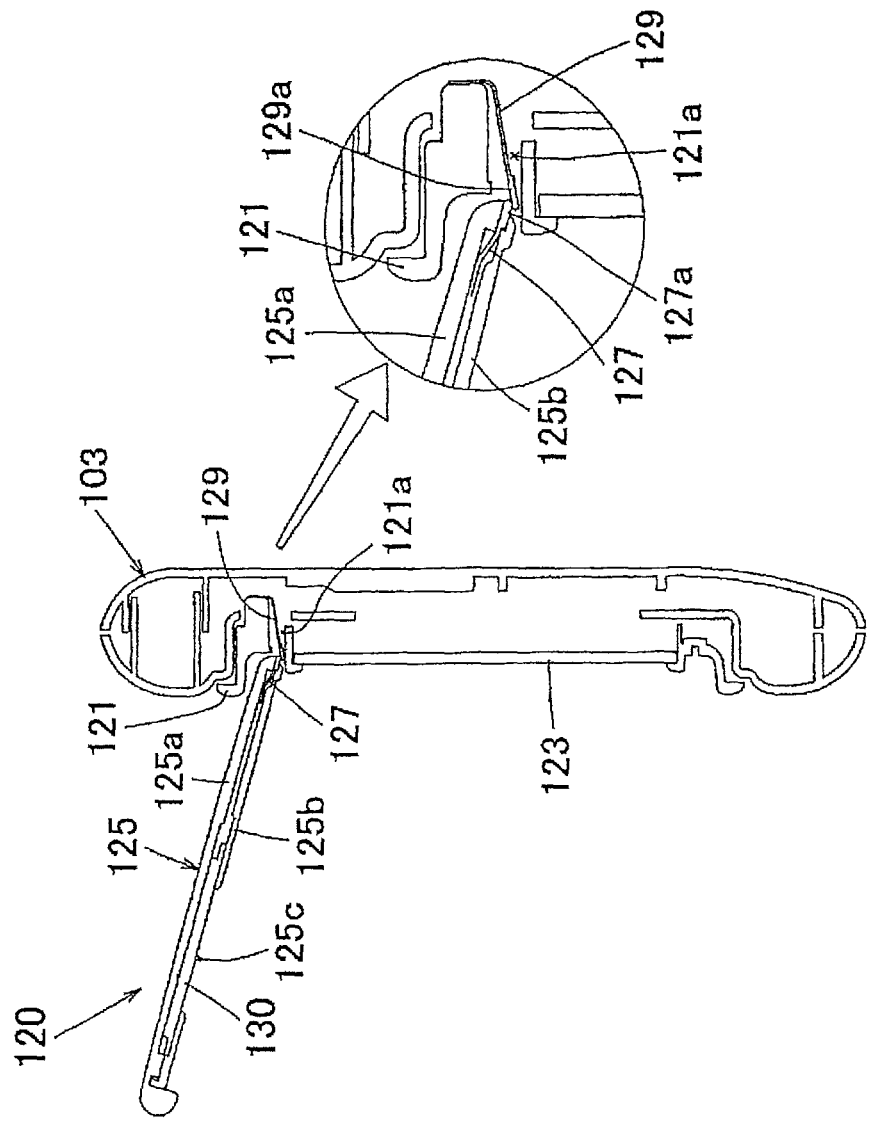
FIG. 5 is a longitudinal sectional view of the vanity mirror unit, with a mirror cover being in an open position.

In addition, the mirror cover 125 is divided into two in the thickness direction of the mirror cover 125, as shown in FIGS. 3 through 5. In other words, the mirror cover 125 has a structure divided into an outer cover portion 125a that forms an outer surface of the mirror cover 125, and an inner cover portion 125b that forms a protection surface for the vanity mirror 123. Both cover portions 125a and 125b are joined together using an appropriate means such as tightening with screws, adhesion or welding after they are formed. The outer cover portion 125a and the inner cover portion 125b are examples of "a first cover and a second cover" in the present invention.

An accommodating space that accommodates an organic EL 130 is formed between the outer cover portion 125a and the inner cover portion 125b, and the organic EL 130 is disposed in the accommodating space. In other words, the organic EL 130 is formed into a sheet-like horizontally elongated generally rectangular shape, is configured to be accommodated within the mirror cover 125, and is fixed to either of the outer cover portion 125a or the inner cover portion 125b when the outer cover portion 125a and the inner cover portion 125b are joined together. Here, the term "fixed" not only denotes the aspect of fixing by screws, adhesive, or welding, but also includes the aspect of fixing by sandwiching the organic EL 130 with the outer cover portion 125a and the inner cover portion 125b. An opening 125c of a horizontally elongated rectangular shape is formed on the inner cover portion 125b as shown in FIG. 2. The light from the organic EL 130 is emitted through the opening 125c.

Next, an electric power supply structure for the organic EL 130 will be described. As shown in FIG. 2, two sets of terminals; movable terminals 127 and fixed terminals 129 paired with each other, are provided in the vanity mirror unit 120. One of the two sets of terminals is disposed approximately at one end of the long side of the mirror cover 125 along which the mirror cover 125 is pivotally joined to the mirror trim 121, and the other set of terminals is disposed approximately at the opposite end of the long side of the mirror cover 125. Specifically, movable terminal 127 is provided at each of the one end and the opposite end along the long side of the mirror cover 125, (positions indicated by the arrows in FIG. 2), and one fixed terminal 129 is provided at each of one end and the opposite end along the long side of the mirror trim 121, (positions indicated by the arrows in FIG. 2). The two movable terminals 127 are an example of "a first metal terminal and a second metal terminal" in the present invention, while the two fixed terminals 129 are an example of "a third metal terminal and a fourth metal terminal" in the present invention.

As shown in FIGS. 3 through 5, each of the movable terminals 127 is formed as a generally T-shaped flat plate to be disposed between the outer cover portion 125a and the inner cover portion 125b of the mirror cover 125, and fixed to either of the outer cover portion 125a or the inner cover portion 125b with screws or the like. A head portion of each of the T-shaped movable terminals 127 is exposed to the outside of the mirror cover 125, and the exposed portion is configured as a press contact portion 127a which can come in contact with the fixed terminal 129.

Further, one of the two movable terminals 127 is connected to a plus terminal of the organic EL 130 via a lead wire (not shown in the figure for the purpose of convenience), while the other movable terminal 127 is connected to a minus terminal of the organic EL 130 via a lead wire (not shown in the figure for the purpose of convenience).

Each of the fixed terminals 129 is elastically deformable plate member, and folded into an L-shape. One side of the L-shape is secured to the mirror trim 121 with screws or the like. In the positions where the fixed terminals 129 are disposed on the mirror trim 121, openings 121a are formed to extend through the mirror trim 121 in front-back direction as the sun visor body 103 is in the pivoted position as shown in FIG. 3. The other side of each of the L-shaped fixed terminals 129 is extended in fore-and-aft direction through the opening 121a. Namely, each of the fixed terminals 129 has a cantilever structure with one end being secured and the other end being a free end, and is extended in the thickness direction of the mirror trim 121, or in the thickness direction of the sun visor body 103, through the opening 121a of the mirror trim 121. At the same time, an extended end 129a protrudes from the front surface of the mirror trim 121 toward the mirror cover 125, to be configured as a portion that can come in contact with the movable terminal 127. The fixed terminal 129 extending in the openings 121a is allowed to bend in the short side direction, namely in vertical direction of the mirror trim 121 within the opening 121a. This means that the elastic deformation is allowed.

Further, although not shown in the figure for the purpose of convenience, one of the two fixed terminals 129 is connected to a plus terminal of a battery via a lead wire or the like, while the other one of the fixed terminals 129 is connected to a minus terminal of the battery via a lead wire or the like. The battery is an example of "a power source" in the present invention.

The movable terminals 127 and the fixed terminals 129 disposed as described above, are configured in a manner such that they are positioned separately from each other when the mirror cover 125 is in the closed position for covering the vanity mirror 123 as shown in FIG. 3, and that when the mirror cover 125 is pivoted from the closed position to the open position for exposing the vanity mirror 123, the press contact portion 127a of the movable terminals 127 pivoting together with the mirror cover 125 come in contact with the extended ends 129a of the fixed terminals 129.

The automobile sun visor 101 according to the present embodiment is configured as described above. Therefore, the sun visor body 103 is pivoted to the operating range when the vanity mirror 123 is used. Then, as the mirror cover 125 is pivoted from the closed position to the open position, the press contact portions 127a of the movable terminals 127 come in contact with the extended ends 129a of the fixed terminals 129 from above in the course of pivoting motion of the mirror cover 125 as shown in FIG. 4, specifically as the mirror cover 125 comes close to its open position. This triggers the battery power supply to the organic EL 130 to make the organic EL 130 emit light (to turn on the light).

Subsequently, the mirror cover 125 is further pivoted to reach the open position as shown in FIG. 5, and is retained in the open position by the stopper mechanism. During the pivoting motion of the mirror cover 125, the press contact portions 127a of the movable terminals 127 moves to pressurize the extended ends 129a of the fixed terminals 129. Thus, the fixed terminals 129, as pressurized at the extended ends 129a, bend downward within the openings 121a of the mirror trim 121. In other words, the extended ends 129a of the fixed terminals 129 undergo elastic deformation in the vertical direction (or in the short side direction) of the mirror trim 121, and the movable terminals 127 and the fixed terminals 129 are kept in contact by the elastic force (or restoring force) generated by the elastic deformation. Preferably, the pivoting range of the mirror cover 125 should be set at somewhere between 100 and 110 degrees, so that the light emitted by the organic EL 130 will not reflect on the vanity mirror 123.

When the mirror cover 125 is pivoted from the open position to the closed position after using the vanity mirror 123, the press contact portions 127a of the movable terminals 127 are separated from the extended ends 129a of the fixed terminals 129. Then, the power supply to the organic EL 130 is stopped, and the light emitted from the organic EL 130 is shut off (the light is turned off). As the press contact portions 127a of the movable terminals 127 are separated from the extended ends 129a of the fixed terminals 129, the elastic force makes the extended ends 129a of the fixed terminals 129 return to the original positions.

Thus, according to the present embodiment, the vehicle sun visor 101 is configured so that the organic EL 130 is provided in the mirror cover 125, power is supplied to the organic EL 130 when the mirror cover 125 is pivoted from the closed position to the open position, and the power supply is shut off when the mirror cover 125 is pivoted from the open position to the closed position. Thus, the power supply to the organic EL 130 can be started or stopped in a streamlined manner by simply carrying out the opening operation or closing operation of the mirror cover 125.

Also, according to the present embodiment, the mirror cover 125 is composed of the outer cover portion 125a and the inner cover portion 125b, stacked in the thickness direction, and is configured so that the organic EL 130 is disposed between the outer cover portion 125a and the inner cover portion 125b. This configuration makes it possible to easily secure a space to dispose the organic EL 130 formed into a thin platy shape, and establishes a streamlined arrangement of structure.

Further, according to the present embodiment, the movable terminals 127 are provided in the mirror cover 125, while the fixed terminals 129 corresponding to the movable terminals 127 are provided in the mirror trim 121, whereby a power supply structure is established between the mirror cover 125 and the mirror trim 121, so that the power supply to the organic EL 130 disposed in the mirror cover 125 which is a movable member, can be started and stopped by the opening and closing motions of the mirror cover 125.

Still further, according to the present embodiment, the fixed terminals 129 are bent, or the fixed terminals 129 are elastically deformed when the movable terminals 127 and the fixed terminals 129 come in touch as the mirror cover 125 is pivoted to the open position. Thus, the movable terminals 127 and the fixed terminals 129 are kept in contact by the elastic force of the fixed terminals 129 without a contact failure that may be caused by the vibration or other factors, and stable power supply to the organic EL 130 is assured.

In addition, according to the present embodiment, the fixed terminals 129 are configured to extend from their portions fixed to the mirror trim 121 toward the front face (frontage) of the mirror trim 121 through the opening 121a in the mirror trim 121, and the extended ends 129a of the fixed terminals 129 are made in contact with the movable terminals 127. In other words, each fixed terminal 129 is configured as a platy terminal of cantilever structure having a free end at its one end, and is extended in the thickness direction of the vanity mirror unit 120 to allow bending in vertical direction (or in the short side direction) of the mirror trim 121. In this way, the fixed terminals 129 can be disposed utilizing a limited narrow space.

Figure 6:
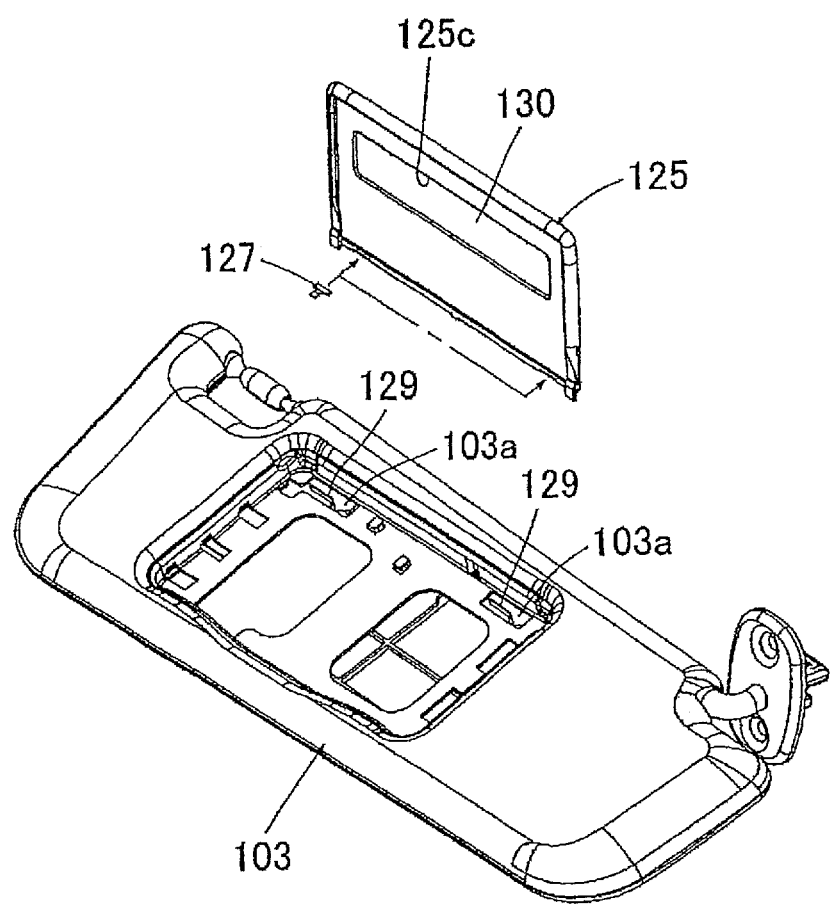
FIG. 6 is an exploded perspective view showing an example of modification regarding fixed terminals.

Next, another embodiment of the present invention will be described referring to FIGS. 6 through 10. In the other embodiment, the mounting positions of the fixed terminals 129 are moved from the mirror trim 121 to the sun visor body 103. The fixed terminals 129 according to this modification example are disposed at respective corners on the upper side of a recess where the vanity mirror unit of the sun visor body 103 is disposed as shown in FIG. 6. Note that the mirror trim 121 and the vanity mirror 123 are omitted in FIG. 6.

Figure 7:
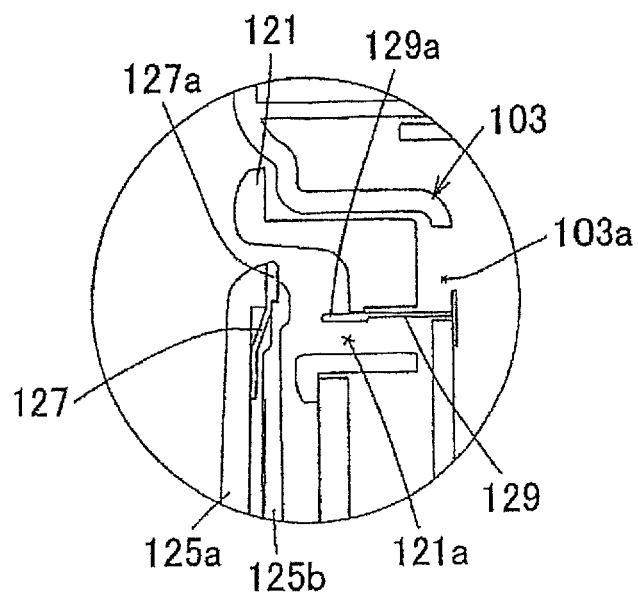
FIG. 7 is a sectional view showing an attachment of the fixed terminal relative to a sun visor body.

As shown in FIGS. 6 and 7, the fixed terminals 129 are secured with screws or the like to the sun visor body 103 at one ends, extended in the thickness direction of the mirror trim 121 (or, in the thickness direction of the sun visor body 103) through openings 103a in the sun visor body 103 and the openings 121a in the mirror trim 121, and the fixed terminals 129 change in direction so as to extend in the long side direction of the mirror trim 121, that is, in the longitudinal direction of the vanity mirror unit 120. Namely, each fixed terminal 129 has a cantilever structure with one end being secured and the other end being a free end, and the extended end 129a extending in the longitudinal direction of the vanity mirror unit 120 protrudes from the front surface of the mirror trim 121 toward the mirror cover 125, to be configured as a portion that can come in contact with the movable terminal 127. In addition, the fixed terminals 129 extending in the opening 121a are allowed to bend toward the short side, namely to bend in vertical direction of the mirror trim 121 within the opening 121a. This means that the elastic deformation is allowed. The constituent elements other than the fixed terminals 129 are configured in the same manner as that in the embodiment described earlier. Therefore, the same components will be denoted by the identical marks, and the descriptions will be omitted or simplified.

Figure 8:
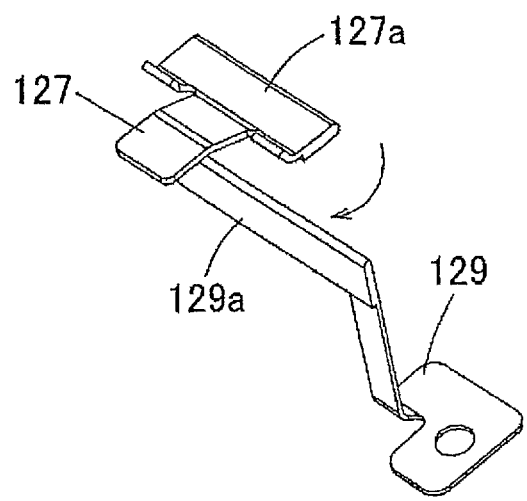
FIG. 8 is an illustration showing the operation of a movable terminal and a fixed terminal related to an example of modification, and showing a condition that the movable terminal is separated from the fixed terminal, which corresponds to the state where the mirror cover is in the closed position.
Figure 9:
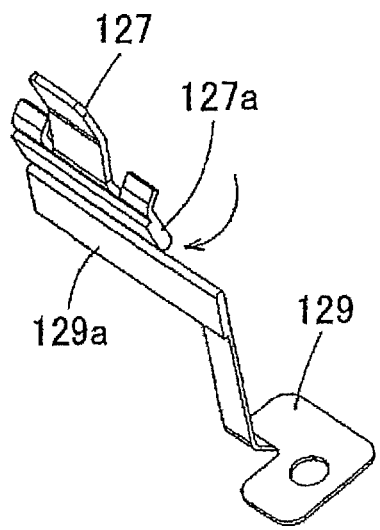
FIG. 9 is an illustration showing the operation of the movable terminal and the fixed terminal related to the example of modification, and showing a condition that the movable terminal is in contact with the fixed terminal, which corresponds to the state where the mirror cover is in the middle of a pivoting motion; and, FIG. 10 is an illustration showing the operation of the movable terminal and the fixed terminal related to the example of modification, and showing a condition that the fixed terminal is bent by the depression caused by the movable terminal, which corresponds to the state where the mirror cover is in the open position.
Figure 10:
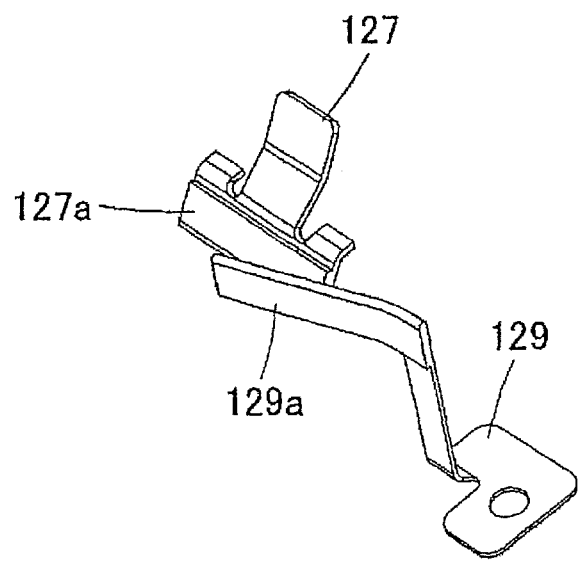

FIGS. 8 through 10 show operation modes of the movable terminals 127 attached to the mirror cover 125, and the fixed terminals 129 attached to the sun visor body 103. When the mirror cover 125 is in the closed position for covering the vanity mirror 123, the movable terminals 127 are separated from the extended ends 129a of the fixed terminals 129, as shown in FIG. 8.

Then, as the mirror cover 125 is pivoted toward the open position, the press contact portions 127a of the movable terminals 127 pivoting together with the mirror cover 125 come in contact with the extended ends 129a of the fixed terminals 129 from above in the course of the pivoting motion, specifically as the mirror cover 125 comes close to its open position, as shown in FIG. 9. This triggers the power supply to the organic EL 130.

When the mirror cover 125 is pivoted further to the open position, the press contact portions 127a of the movable terminals 127 pressurize the extended ends 129a of the fixed terminals 129. This causes the extended ends 129a to bend downward within the opening 121a of the mirror trim 121 as shown in FIG. 10. In other words, the extended ends 129a of the fixed terminals 129 undergo an elastic deformation in the vertical direction (or in the short side direction) of the mirror trim 121, and the movable terminals 127 and the fixed terminals 129 are kept in contact by the elastic force (or restoring force) generated by the elastic deformation.

According to the other embodiment, the fixed terminals 129 are provided in the sun visor body 103, thereby a power supply structure is established between the mirror cover 125 and the sun visor body 103, so that the power supply to the organic EL 130 disposed in the mirror cover 125 can be started and stopped by the opening and closing motions of the mirror cover 125.

Also, according to the other embodiment, the extended end 129a of the fixed terminal 129 extends along the long side of the mirror trim 121, that is, in the longitudinal direction of the vanity mirror unit 120. This allows the design with which the extending length of the extended end 129a of the fixed terminal 129 can be obtained easily to avoid plastic deformation of the fixed terminal 129.

The embodiments shown in the figures are described as a pivoting type where the mirror cover 125 pivots around the given pivoting shaft between the closed position and the open position relative to the mirror trim 121. However, the present invention is not limited to this configuration and may be changed to a sliding type where the mirror cover 125 slides along the surface of the vanity mirror 123. Also, in another embodiment, the extended end 129a of the fixed terminal 129 is arranged to extend along the long side of the mirror trim 121. However, to the extended end 129a of the fixed terminal 129 may extend along the short side of the mirror trim 121, or in the short-length direction of the vanity mirror unit 120. The effect obtained by this arrangement is equivalent to the effect of other embodiment.

Further in the embodiment shown in the figures, the organic EL 130 is adopted as the lighting apparatus. However, the present invention is not limited to this configuration, and an inorganic electroluminescent (inorganic EL), a light emitting diode (LED), or an electric bulb may be adopted.

In addition, the structure of the mirror cover 125 in the embodiments shown in the figures is configured to split the whole mirror cover 125 into the outer cover portion 125a and the inner cover portion 125b. However, a part of the inner surface of the mirror cover 125 may be divided to form an inner cover portion 125b. Also, the embodiments shown in the figures are configured so that the fixed terminals 129 are bent, however, it may be configured so that the movable terminals 127 are bent, or both the movable terminals 127 and the fixed terminals 129 are bent.

In view of the present invention, the following aspects may be configured: an automobile sun visor includes: a sun visor body; a mirror provided in the sun visor body; and a mirror cover movable between the closed position for covering the mirror and the open position for exposing the mirror, with a lighting apparatus provided in it. The mirror cover has movable terminals connected to the lighting apparatus and the sun visor body has fixed terminals connected to the power source end. The power is supplied to the lighting apparatus by the movable terminals coming in touch with the fixed terminals when the mirror cover is moved from the closed position to the open position, while the power supply to the lighting apparatus is shut off by the separation of movable terminals from the fixed terminals when the mirror cover is moved from the open position to the closed position. The contact between the movable terminals and the fixed terminals is maintained by the elastic force generated by the elastic deformation of at least one of the movable terminals and the fixed terminals.

According to the aspect described above, the contact between the movable terminals and the fixed terminals is maintained by the elastic force generated by the elastic deformation without having influence from vibration or the like, to assure the stable power supply to the lighting apparatus.

Also, in the aspect described above, at least one of the movable terminals and the fixed terminals are platy terminals fixed at one end with the other end being a free end.

In the configuration described above, terminals that easily undergo the elastic deformation can be obtained by using platy terminals of a cantilever structure for at least one of the movable terminals and the fixed terminals.

The relations between each constituent element in the present embodiments and the matters specifying the present invention are as follows: Needless to say, each constituent element in the present embodiments is no more than an example implementation regarding the matters specifying the present invention, and each constituent element of the present invention shall not be limited to that described below. The vanity mirror unit 120 is an example of configuration corresponding to "a mirror unit" in the present invention. The organic EL 130 is an example of configuration corresponding to "a lighting apparatus" in the present information. The mirror trim 121 is an example of configuration corresponding to "a mirror retaining member" in the present invention. The vanity mirror 123 is an example of configuration corresponding to "a mirror" in the present invention. The mirror cover 125 is an example of configuration corresponding to "a mirror cover" in the present invention. The outer cover portion 125a and the inner cover portion 125b are examples of configuration corresponding to "a first cover and a second cover" in the present invention. The two movable terminals 127 are an example of configuration corresponding to "a first metal terminal and a second metal terminal" in the present invention. The two fixed terminals 129 are an example of configuration corresponding to "a third metal terminal and a fourth metal terminal" in the present invention. The battery is an example of configuration corresponding to "a power source" in the present invention.

What is claimed is:

1. An automobile sun visor comprising:
a sun visor body; and
a mirror unit provided in the sun visor body including: a mirror; a mirror retaining member to keep the mirror in place; and a mirror cover attached to the mirror retaining member to be movable between a closed position for covering the mirror and an open position for exposing the mirror, with a lighting apparatus provided in it, wherein
power is supplied to the lighting apparatus when the mirror cover is moved from the closed position to the open position, and the power supply to the lighting apparatus is shut off when the mirror cover is moved from the open position to the closed position,
the mirror cover has a first cover and a second cover stacked in a thickness direction, and
the lighting apparatus is disposed between the first cover and the second cover to be fixed to at least one of the first cover and the second cover,
the mirror cover has a first metal terminal and a second metal terminal,
the mirror retaining member has a third metal terminal corresponding to the first metal terminal, and a fourth metal terminal corresponding to the second metal terminal,
the first metal terminal and the second metal terminal are connected to the lighting apparatus,
the third metal terminal and the fourth metal terminal are connected to a power source,
the power is supplied to the lighting apparatus when the mirror cover is moved from the closed position to the open position, since the first metal terminal comes in contact with the third metal terminal, and at the same time the second metal terminal comes in contact with the fourth metal terminal, and
the power supply to the lighting apparatus is shut off when the mirror cover is moved from the open position to the closed position, since the first metal terminal is separated from the third metal terminal and at the same time the second metal terminal is separated from the fourth metal terminal,
the third metal terminal and the fourth metal terminal are formed into a platy shape,
when the mirror cover is in an opening process of moving from the closed position to the open position, the third metal terminal is bent due to the contact with the first metal terminal, and the fourth metal terminal is bent due to the contact with the second metal terminal, and
the third metal terminal and the fourth metal terminal are extending in the thickness direction of the mirror unit, and
at least one of an extended end of the third metal terminal and an extended end of the fourth metal terminal is arranged to extend along a long side or a short side of the mirror unit.

2. An automobile sun visor comprising:
a sun visor body; and
a mirror unit provided in the sun visor body including: a mirror; a mirror retaining member to keep the mirror in place; and a mirror cover attached to the mirror retaining member to be movable between a closed position for covering the mirror and an open position for exposing the mirror, with a lighting apparatus provided in it, wherein power is supplied to the lighting apparatus when the mirror cover is moved from the closed position to the open position, and the power supply to the lighting apparatus is shut off when the mirror cover is moved from the open position to the closed position,
the mirror cover has a first cover and a second cover stacked in a thickness direction, and
the lighting apparatus is disposed between the first cover and the second cover to be fixed to at least one of the first cover and the second cover,
the mirror cover has a first metal terminal and a second metal terminal,
the sun visor body has a third metal terminal corresponding to the first metal terminal, and a fourth metal terminal corresponding to the second metal terminal,
the first metal terminal and the second metal terminal are connected to the lighting apparatus,
the third metal terminal and the fourth metal terminal are connected to a power source,
the power is supplied to the lighting apparatus when the mirror cover is moved from the closed position to the open position, since the first metal terminal comes in contact with the third metal terminal, and at the same time the second metal terminal comes in contact with the fourth metal terminal,
the power supply to the lighting apparatus is shut off when the mirror cover is moved from the open position to the closed position, since the first metal terminal is separated from the third metal terminal and at the same time the second metal terminal is separated from the fourth metal terminal,
the third metal terminal and the fourth metal terminal are formed into a platy shape,
when the mirror cover is in an opening process of moving from the closed position to the open position, the third metal terminal is bent due to the contact with the first metal terminal, and the fourth metal terminal is bent due to the contact with the second metal terminal, the third metal terminal and the fourth metal terminal are extending in the thickness direction of the mirror unit, and at least one of an extended end of the third metal terminal and an extended end of the fourth metal terminal is arranged to extend along a long side or a short side of the mirror unit.

* * * * *